UNITED STATES PATENT OFFICE.

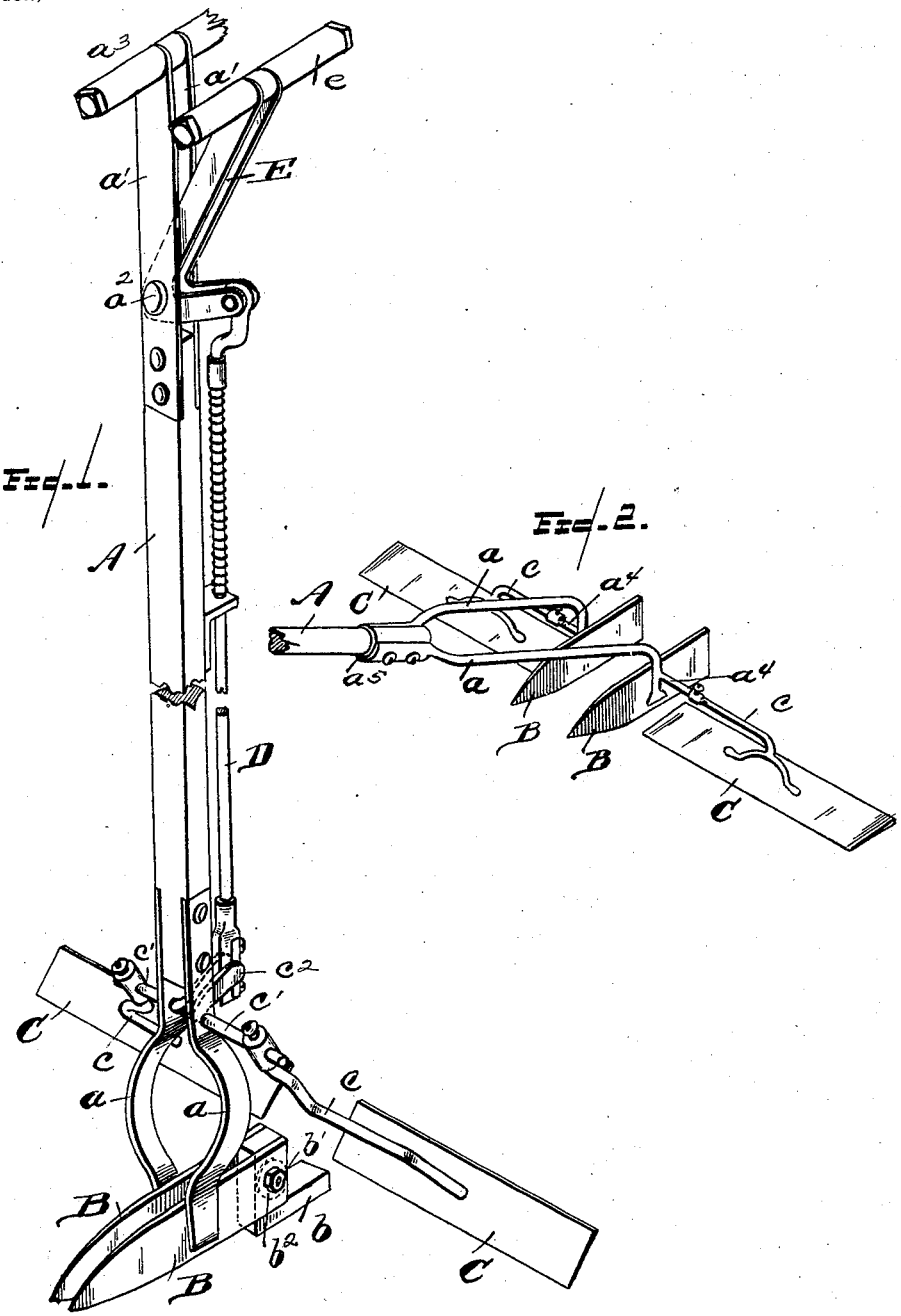

ROBERT R. BRIGGS, OF DETROIT, MICHIGAN.

WEEDING IMPLEMENT.

SPECIFICATION forming part of Letters Patent No. 711,553, dated October 21, 1902.

Application filed August 10, 1901. Serial No. 71,667. (No model.)

*To all whom it may concern:*

Be it known that I, ROBERT R. BRIGGS, a citizen of the United States, residing at Detroit, county of Wayne, State of Michigan, have invented a certain new and useful Improvement in Weeding Implements; and I declare the following to be a full, clear, and exact description of the invention, such as will enable others skilled in the art to which it pertains to make and use the same, reference being had to the accompanying drawings, which form a part of this specification.

My invention relates to an improvement in weeding implements and is shown in the accompanying drawings, in which—

Figure 1 is a perspective, and Fig. 2 is a view showing the use of the guards in a variation.

The object of my invention is to provide improved means for cross weeding or hoeing beets and other plants, and particularly when such plants are small.

In the drawings, A represents the handle of the device, and $a\ a$ represent metal extensions of the handle, to which are attached the guards B B. These guards are plates standing on edge and are pointed at one end to adapt them to enter under the leaves of the plant as the guards are moved into position on the opposite sides of the plant.

$b$ is a shoe having a vertical extension coming between the ends of the guards, to which it is attached by the bolt $b'$. This shoe $b$ prevents the guards from entering the soil too far when pressure is applied to the device and helps to hold it in position while being operated. The shoe also serves as a spreader to increase the separation of the guards as the plants get larger, either by the use of a thicker shoe or by the use of washers $b^2$. (Shown in dotted lines.)

The extensions $a\ a$ are curved outward above the guards to make room for the head or leaves of the plant.

C C are movable cutting blades or hoes supported on arms $c\ c$ from the rock-shaft $c'$. This rock-shaft is mounted in the extensions $a\ a$ and is provided between them with a crank $c^2$.

D is a connecting-rod pivoted at the lower end to the crank $c^2$ and at the upper end to the bell-crank lever E. The lever E has its fulcrum between the extensions $a'\ a'$ on the bolt $a^2$.

$a^3$ represents a hand-bar fixed to the ends of the extensions $a'\ a'$, and $e$ represents a similar hand-bar fixed to the lever E, by which it is operated.

The arms $c\ c$ have an adjustable connection with the rock-shaft $c'$, by means of which the blades C C may be adjusted to and from each other.

In operating the device the guards B B are moved into position straddling the plant and under the leaves or head and sufficient pressure put upon the device to hold the guards in position. The lever E is then operated by forcing down the hand-bar $e$, which through the operation of the connecting-rod D and the rock-shaft $c'$ causes the blades or hoes to move through the earth on each side of the guards and near to them, cutting off all weeds and loosening the soil.

In Fig. 2 is shown a variation in which the hoes and guards are used in combination, the hoes being arranged to cut the weed as the guards pass the plant and protect it. In this form the extensions $a\ a$ are provided with horizontal arms $a^4$, which have a telescoping connection with the arms $c\ c$, whereby the hoes are permitted a double adjustment either to or from each other or to change their incline.

In the form shown in Fig. 1 the guards B B are separated or spaced by the shoe $b$ and the washers $b^2$. In the form shown in Fig. 2 this adjustment is secured by the use of sleeves $a^5$, a thinner sleeve being used when it is desired to have the guards nearer together and a thicker sleeve when it is desired to increase the separation.

What I claim is—

1. The combination of the guards arranged to enter under the leaves or heads of the plant and the hoes having a movement relative to the guards, substantially as described.

2. The combination of the guards and the shoe, substantially as described.

3. The combination of the guards, the handle, the hoes and means for swinging the hoes from a horizontal axis, substantially as described.

4. The combination of the means for holding the device in a fixed position relative to the plant, the hoes, the rock-shaft from which the hoes are supported, the connecting-rod, and the operating-lever, substantially as described.

5. The combination of the guards B and means for adjusting the relative distance between the guards, substantially as described.

In testimony whereof I sign this specification in the presence of two witnesses.

ROBERT R. BRIGGS.

Witnesses:
S. E. THOMAS,
FRANK DUWE.